Oct. 7, 1952 E. O. SCHONSTEDT 2,612,693
SUN COMPASS

Filed March 8, 1951 6 Sheets-Sheet 1

INVENTOR.
E. O. SCHONSTEDT
BY
*G. D. O'Brien*
*R. M. Hicks* ATTYS.

Oct. 7, 1952 E. O. SCHONSTEDT 2,612,693
SUN COMPASS
Filed March 8, 1951 6 Sheets-Sheet 2
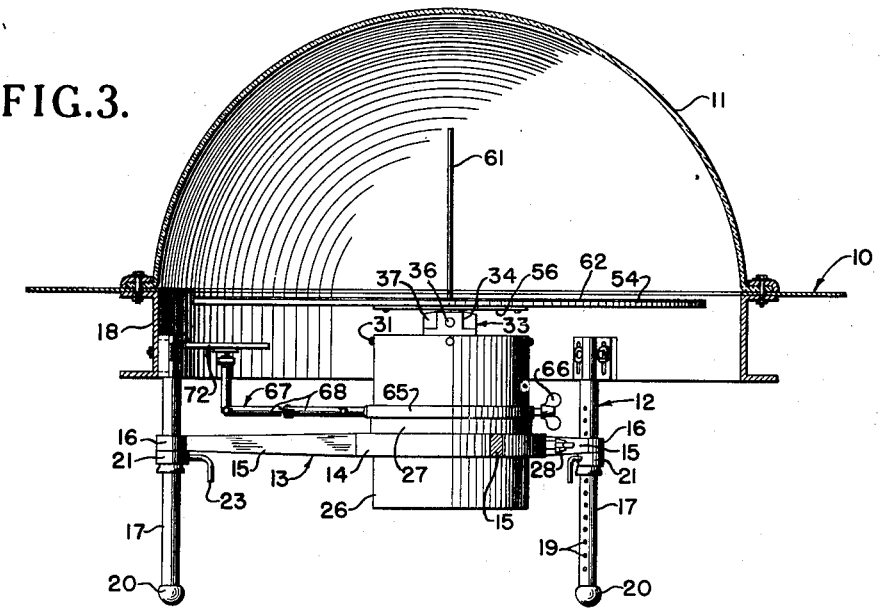
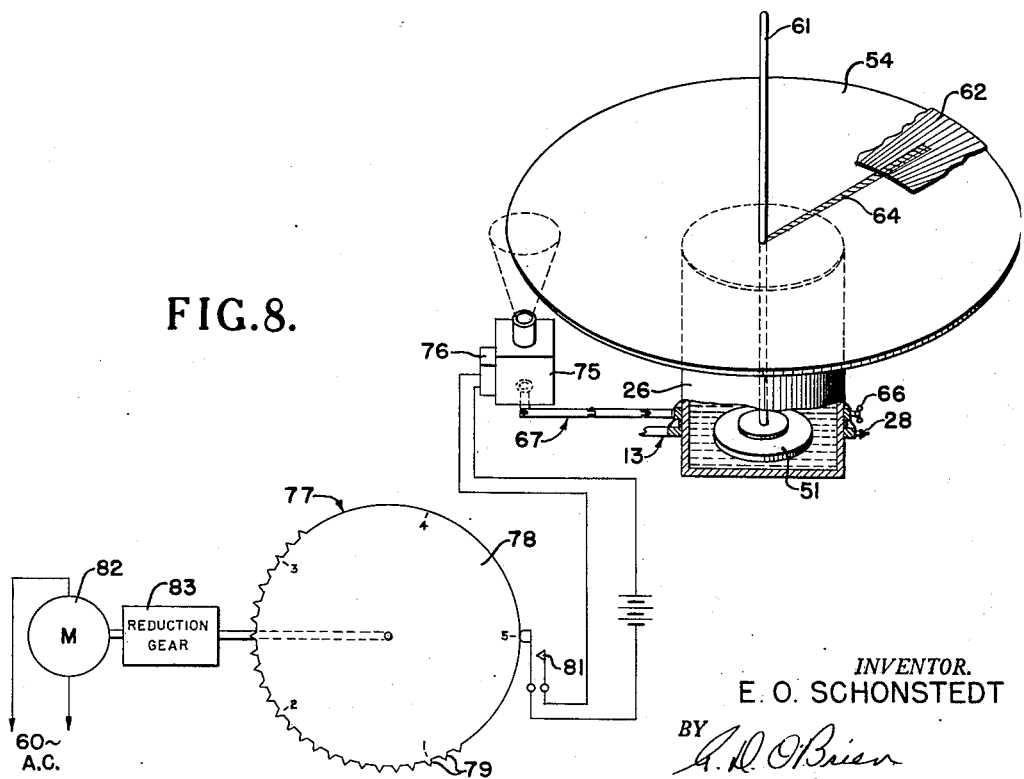
INVENTOR.
E. O. SCHONSTEDT
BY
ATT'YS.

Oct. 7, 1952  E. O. SCHONSTEDT  2,612,693
SUN COMPASS

Filed March 8, 1951  6 Sheets-Sheet 5

INVENTOR.
E. O. SCHONSTEDT
BY
*G. D. O'Brien*
*R. M. Hicks* ATTYS.

Oct. 7, 1952  E. O. SCHONSTEDT  2,612,693
SUN COMPASS
Filed March 8, 1951  6 Sheets-Sheet 6
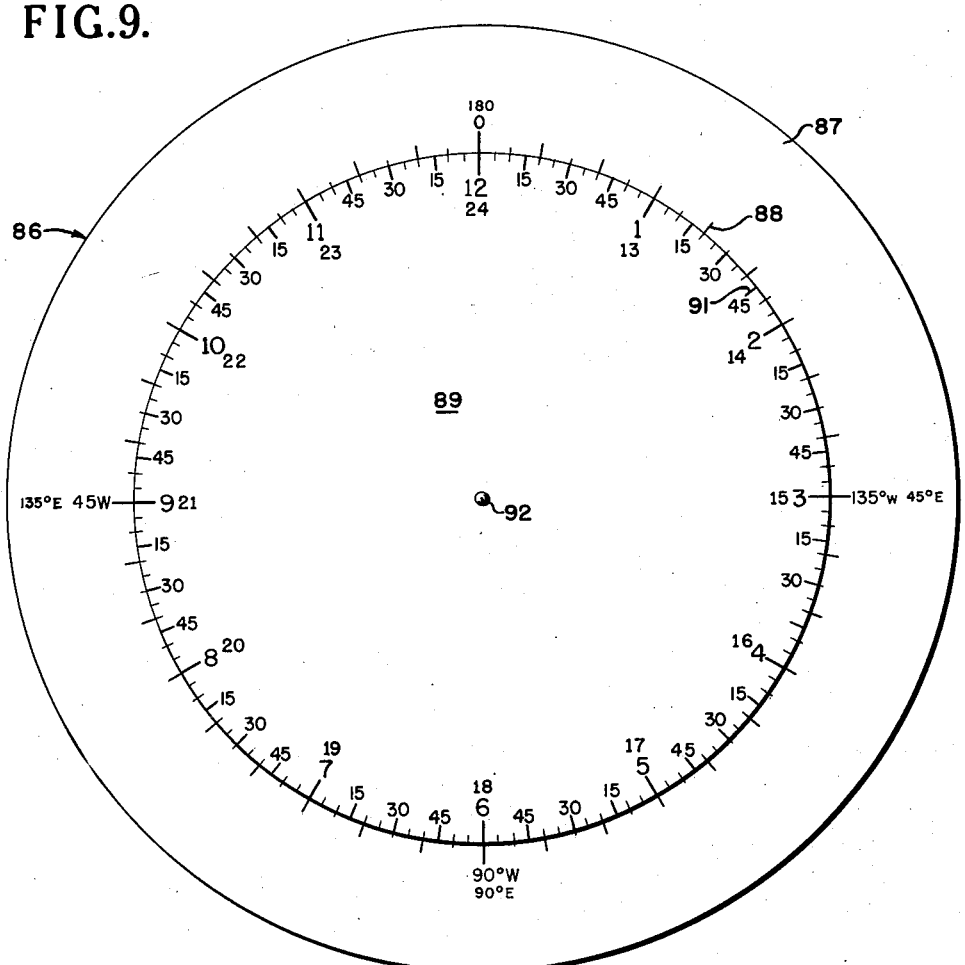
FIG. 9.
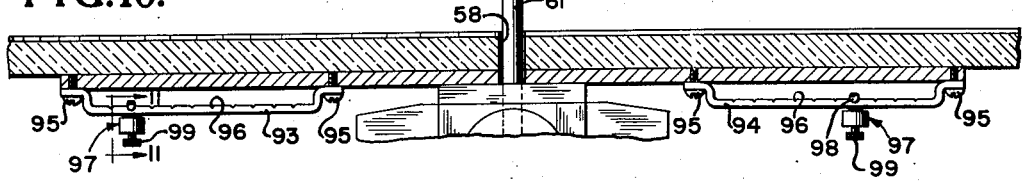
FIG. 10.
FIG. 11.
INVENTOR.
E. O. SCHONSTEDT
BY
G. D. O'Brien
R. M. Hicks ATTYS.

Patented Oct. 7, 1952

2,612,693

UNITED STATES PATENT OFFICE 2,612,693

SUN COMPASS

Erick O. Schonstedt, Washington, D. C.

Application March 8, 1951, Serial No. 214,619

2 Claims. (Cl. 33—61)

(Granted under the act of March 3, 1883, as amended April 30, 1928; 370 O. G. 757)

The present invention relates generally to aerial navigation and more particularly to a relative bearing indicator or sun compass for use in the astral dome of an aircraft and for indicating variations in heading of an aircraft or other moving body with respect to the sun's azimuth.

The device of the present invention is employed in the accurate computation of heading of an aircraft or other moving body for navigational purposes or for use such, for example, as during measurement of the earth's total magnetic field vector as disclosed in my copending application for Method and Apparatus for Measuring the Earth's Total Magnetic Field Vector, Serial No. 187,653, filed September 29, 1950.

In accordance with prior art methods of measuring the relative bearing of an aircraft with respect to the sun, the navigator stands with his head within the astral dome and first levels an instrument having a sighting telescope which he adjusts until the cross hairs thereof intersect the center of the sun. In this position of adjustment the instantaneous relative bearing is indicated on a circular scale, and is read and recorded by the navigator, or is communicated to an assistant who records the reading. The foregoing steps with the exception of the leveling step are repeated a sufficient number of times to obtain an average reading from which the effects of aircraft accceleratoins are substantially eliminated. This prior art method has the disadvantage that it is difficult, if at all possible, to obtain readings at precisely timed intervals.

In accordance with the arrangement of the present invention, a transparent disk having a semiopaque upper surface is provided with a damped pendulous mounting whereby the disk is maintained in substantially horizontal position, the disk having inscribed on the semiopaque surface thereof a scale marked in degrees of azimuth. A rod secured to the disk for movement therewith projects vertically and axially above the disk, and is mounted to cast a shadow across the scale of the disk when the sun compass is subjected to the sun's rays.

In accordance with the preferred embodiment of the present invention, a mirror or other reflecting surface is adjustably mounted beneath the disk to reflect the image of the shadow and a portion of the scale adjacent thereto to the navigator seated below the astral dome of the aircraft in which position he may conveniently operate and adding machine to record thereon readings viewed in the mirror. When preferably ten readings have been recorded at predetermined time sequence proportional to the period of phugoid oscillations of the aircraft, the sum of the ten readings is obtained from the adding machine. This sum is also the average value of the readings upon proper shift of the decimal point.

In a slight modification of the present invention the mirror may be replaced by a camera for photographically recording the heading and variations thereof as indicated by the movement of the shadow with respect to the disk. Such photographs are taken at predetermined intervals of time and are averaged to produce a more accurate result.

An object of the present invention is to provide a new and improved apparatus for indicating variations in heading with respect to the sun's azimuth of an aircraft in flight.

Another object is to provide new and improved apparatus for indicating such variations in heading and which is rugged and simple in construction.

Still another object is to provide apparatus for indicating the heading of an aircraft in flight with respect to the sun's azimuth which is maintained in a substantially stable condition with respect to vertical.

A further object is to provide apparatus for indicating the relative bearing of an aircraft in flight with respect to the sun's azimuth wherein the image of such indication is reflected to a position for convenient viewing.

A further object is to provide a sun compass which may be placed in an astral dome of an aircraft which may be conveniently read and the readings recorded by the navigator from a seated position below the instrument.

A still further object is to provide apparatus for photographically recording indications of variations in heading with respect to the sun of an aircraft in flight.

Other objects and many of the attendant advantages of this invention will be readily appreciated as the same becomes better understood by reference to the following detailed description when considered in connection with the accompanying drawings wherein:

Fig. 3 is a sectional view of a portion of the aircraft and showing the preferred embodiment of the sun compass or relative bearing indicator of the present invention in elevation;

Fig. 8 is a schematic diagram of the modified embodiment of the present invention wherein a photographic recording is made of variations in heading;

Fig. 9 is a plan view of a local sun time chart for use with the sun compass of the present invention;

Fig. 10 is a fragmentary sectional view of the compass and showing means carried thereby for balancing the pendulously supported system against coriolis acceleration effects; and Fig. 11 is a sectional view taken along the line 11—11 of Fig. 10.

Referring more particularly to the drawings wherein like numerals indicate like parts throughout the several views, 10 indicates an aircraft having an astral dome 11 in which the sun compass indicated generally at 12 is located.

Figure 5:
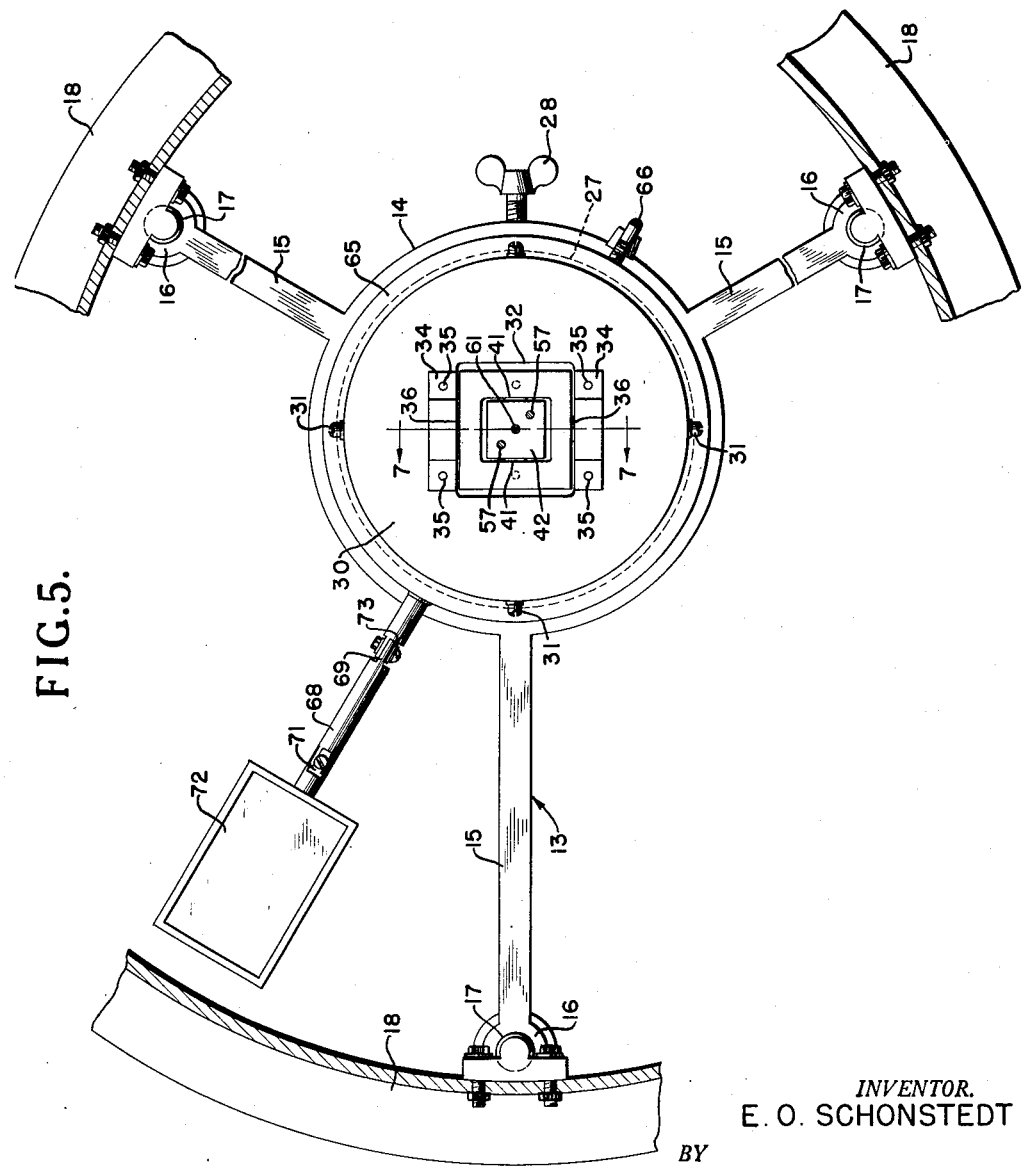
Fig. 5 is a sectional view taken along the line 5—5 of Fig. 4.

The supporting spider indicated generally at 13 and as best seen in Fig. 5 comprises a mounting ring 14 having preferably a plurality of horizontal arms 15 radiating therefrom, each of the arms terminating in a socket 16. Each of the sockets 16 has extending vertically therethrough a stanchion or rod 17, the stanchions 17 being bolted to the circular frame 18 below the astral dome 11. The lower ends of stanchions 17 are provided with rubber bumper pads 20 in order to prevent injury to personnel.

The stanchions 17 are provided with a plurality of transverse bores 19. A flanged ring 21 is mounted on each of the stanchions 17. Mounted in bore 22 of each ring 21 is a sliding bolt 23 having a flat portion 24. Pin 25, mounted in ring 21, extends into bore 22 and bears against flat portion 24 of bolt 23 for limiting movement of the bolt 23. It is, of course, understood that bolt 23, when in locking position secures the ring 21 to stanchion 17, in each case, by extending through bore 22 of ring 21 and one of the bores 19 of stanchion 17. Each of the socket ends 16 of the spider 13 rests on one of the rings 21, thus the spider may be held in a plurality of vertically adjusted positions.

A cylindrical vessel 26 having a circumferential ring 27 secured intermediate the top and bottom thereof and containing a quantity of oil of known viscosity is mounted for rotational adjustment in mounting ring 14, a clamping screw 28 being threadedly mounted in ring 14 for locking vessel 26 in rotational adjustment.

Vessel 26 is provided with a closed bottom 29 and a removable top 30, the top being secured to the vessel by means of screws 31. Top 30 has an axial opening 32 for freely receiving the gimbals assembly indicated generally at 33. The gimbals assembly is mounted on the top 30 by supports 34, Figs. 5 and 7, the supports being secured to the top by means of screws 35. Pins 36 are horizontally fixed in supports 34 and extend inwardly therefrom.

Mounted for pivotal movement on pins 36 is a gimbal ring 37. Ball bearing assemblies 38 are mounted in sockets 39 of ring 37 to receive extensions of pins 36. Gimbal ring 37 has mounted therein and extending inwardly therefrom pins 41, Fig. 4, which are arranged at a 90° position with respect to pins 36.

Axial member 42 of the gimbals assembly 33 has mounted in sockets 43 therein ball bearing assemblies 44 which receive the pins 41 of ring 37. Member 42 is provided with an axial bore 45 having a reduced portion 46. A rod 47 is secured in bore 45, Fig. 7, by set screws 48. Rod 47 extends downwardly into vessel 26 and has supported thereon by set screws 49, Fig. 4, a pendulum member or plumb bob 51.

Pendulum member 51 has an annular groove 52 formed adjacent the lower edge thereof, a ring 53 of rubber-like material being mounted therein for the purpose of preventing contact of member 51 with the inner wall of vessel 26.

Figure 7:
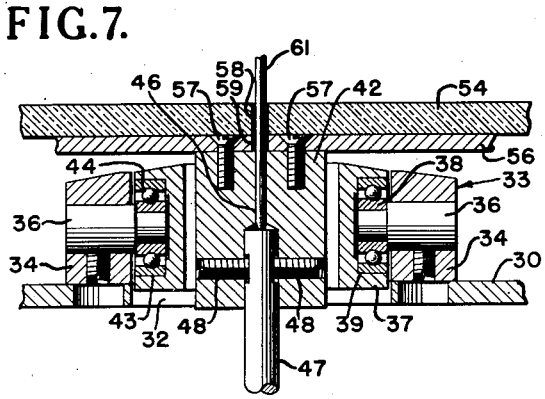
Fig. 7 is a sectional view taken along line 7—7 of Fig. 5.

A transparent disk member 54 is secured by a plurality of screws 55 to a smaller metallic disk member 56, while the smaller disk member is secured by screws 57, Fig. 7, to the axial member 42.

The disks 54 and 56 have axial bores 58 and 59, respectively, formed therein. A rod 61 of small diameter passes through bores 58 and 59 and is received in reduced bore 46, fitting snugly therein. A plurality of rods 61 of different lengths may be furnished for use with the device of the present invention in order to meet a wide range of conditions of use. A condition at one extreme is when the sun's rays reach the sun compass at an angle approaching parallel to the surface of disk 54. Under this condition, a short rod 61, is used and the sun compass is moved on stanchions 17 well into the astral dome 11 in order to receive the sun's rays and to prevent contact of the upper end of rod 61 with the dome 11. A condition at the opposite extreme is when the sun's rays reach the sun compass at an angle approaching the vertical. Under this condition, a long rod is used in order to extend the shadow cast by rod 61 well into a chart 62 mounted on disk 54.

Figure 6:
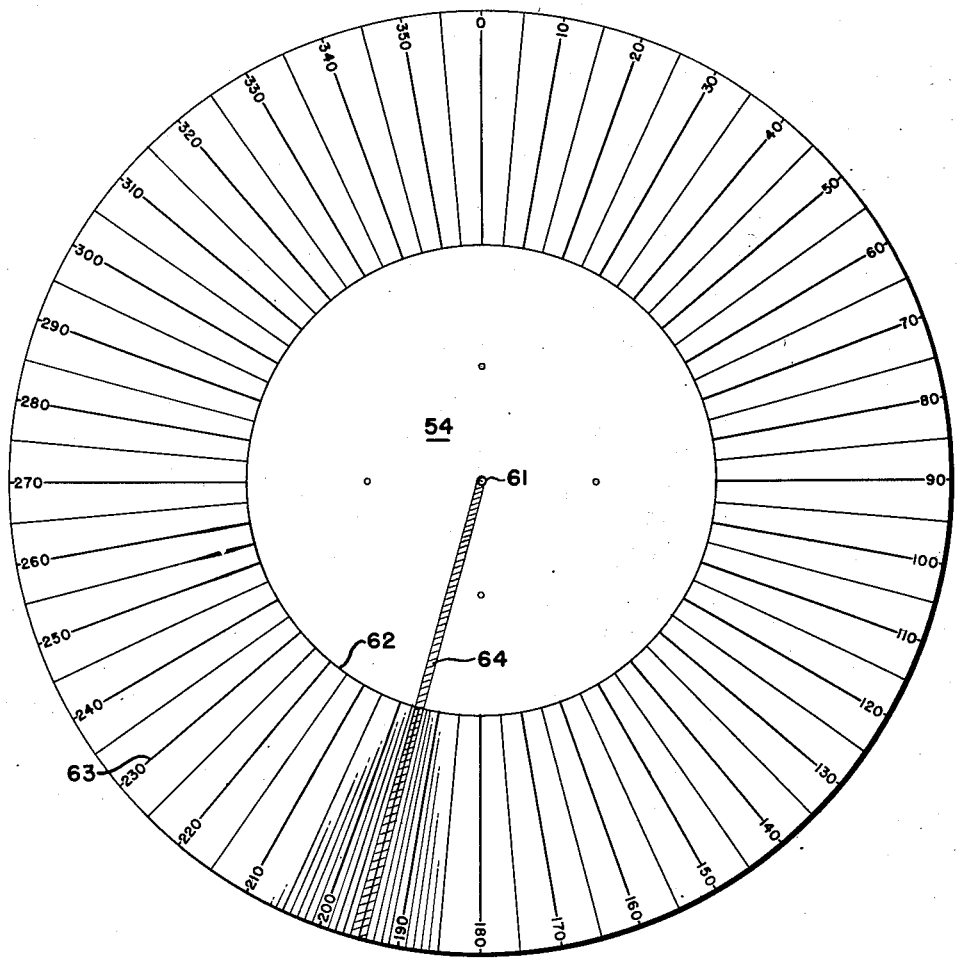
Fig. 6 is a plan view of the dial per se.

The chart 62, Fig. 6, is formed of a semiopaque material such, for example, as frosted glass, translucent white celluloid, or other suitable material applied to the upper surface of disk 54 and is inscribed with a scale 63 indicative of degrees of azimuth and which is visible from below disk 54.

It is, of course, to be understood that the shadow, as indicated at 64, of rod 61 extends across scale 63, the position thereof on the scale changing as the heading and position of the aircraft varies and as time changes.

In the preferred form of the invention, a supporting ring 65 is held in adjusted position by a locking screw 66 threadedly mounted thereon and engaging the vessel 26, the ring 65 resting on ring 27. A supporting articulated arm indicated generally at 67 extends horizontally from ring 65. Arm 67 comprises a plurality of sections 68 joined by elbow joints 69 and 71. A mirror 72 is mounted on one of the sections 68 by means of a locking ball joint 70. The joints 69 have the pivoting axes thereof arranged horizontally, while the joint 71 has the axis thereof arranged at right angles to those of joints 69. By adjusting the angle of the joints 69, 70 and 71 and by rotating ring 65 around the vessel 26, a wide range of positions and angles beneath disk 54 may be selected for the mirror 72. Bolts 73 which form the axes of joints 69 and 71 have nuts 74 threadedly mounted thereon whereby the joints may be set in any one of the adjusted positions thereof required to position the mirror 72 beneath that portion of scale 63 whereon the shadow 64 is located.

It is obvious from the foregoing that the mirror 72 may be moved and locked in a position below disk 54 to reflect to the navigator positioned below the astral dome an image of that portion of the disk 54 and scale 63 on which the shadow of rod 61 appears.

The foregoing mirror arrangement is employed for the reason that the sun compass occupies the interior of the astral dome, leaving no room therein for the navigator. It is, of course, understood that a plurality of mirrors or other reflecting devices arranged in the form of a periscope may, likewise, be employed beneath disk 54 to reflect the image of the shadow and scale to the navigator.

Figure 2:
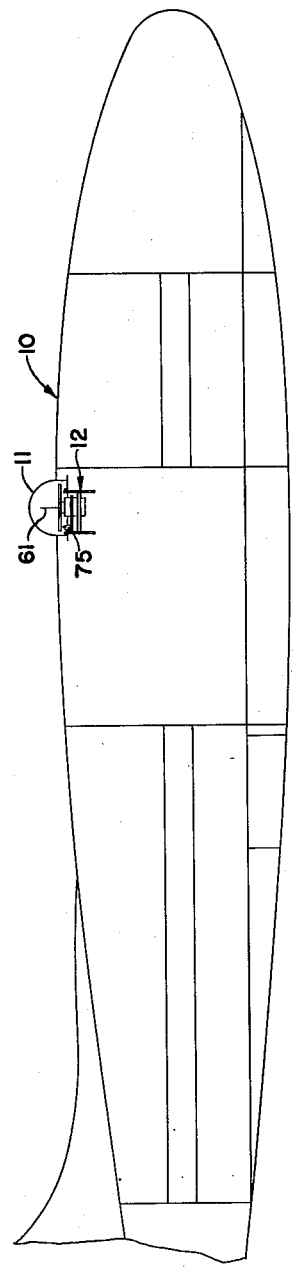

In Figs. 2 and 8, an alternative form of the present invention is illustrated. A camera 75 having a large film capacity and of a variety suitable for the purpose is mounted on locking ball joint 70 of supporting arm 67 in place of the mirror 72. The camera 75 is employed to make a photographic record of variations in heading of the aircraft as indicated by movement of the shadow 64 with respect to scale 63, photographs being made at measured intervals of time during the flight of the aircraft.

The camera 75 is provided with an electrically operated shutter and film feed mechanism indicated schematically at 76. A cam and switch mechanism 77 is provided to energize the shutter mechanism 76 at timed intervals during the flight of the aircraft. Mechanism 77 has provided therefor a cam 78 having a plurality of raised cam surfaces 79 whereby switch 81 is closed to energize the shutter mechanism 76. A synchronous motor 82 drives a reduction gear 83 which in turn drives the cam 78 at a speed of one revolution in 5 minutes, the surfaces 79 being spaced to energize the shutter mechanism to expose the film contained in the camera and to move the film to a new position every 6 seconds for a period of approximately 2 minutes of each 5 minute period. If desired the cam surfaces 79 may be removable for adjustment around the periphery of cam 78, thus the 2 minute period may be changed with respect to the 5 minute period.

An average of the photographic values over the 2 minute interval is taken so as to eliminate the effects of aircraft accelerations on the accuracy of the measurements it being recalled that the compass assembly is pendulously supported and therefore is susceptible to angular displacement in response to accelerations of the aircraft. The average of the values is representative of the aircraft relative bearing for the midpoint of the interval. A two-minute interval is employed here but this interval may be varied to suit the aircraft flight characteristics.

In computing true heading of the aircraft, the navigator's watch is set for Greenwich sun time which is Greenwich mean time plus or minus the correction for equation of time, such correction being given on the azimuth computer disclosed in Patent No. 2,408,776 issued to Joseph Hilsenrath and Samuel Globe. The position of the aircraft with respect to latitude and longitude being known, the local sun time can be determined by correlating the instant position of the aircraft with Greenwich sun time. By employing local sun time, latitude, and day of the year, the sun's azimuth can be computed by using the aforementioned azimuth computer. By employing the reading of the sun's azimuth as thus obtained from the azimuth computer and the reading of the sun compass as obtained from scale 63, true heading may be computed, as will appear more fully hereinafter.

In order to secure local sun time, there has been provided a local sun time chart 86 as shown in Fig. 9. Chart 86 comprises a disk member 87 having a scale 88 adjacent the periphery thereof, the scale 88 being marked in degrees of longitude. A second disk 89 of smaller diameter than disk 87 is provided with a scale 91 marked in hours and minutes of the day. Disks 87 and 89 are rotatively joined together at the axes thereof by a pin or rivet 92.

In the operation of chart 86, the zero marking of scale 88 is brought by rotation of one of the disks with respect to the other into coincidence with the marking on scale 91 indicative of Greenwich sun time as shown by the navigator's watch. By selecting the present longitude position of the aircraft on scale 88, local sun time will be indicated on scale 91 immediately adjacent the aforesaid longitude position marking on scale 88.

In order to compensate for the coriolis forces encountered in aircraft which tend to tilt the pendulously supported disk 54, a pair of diametrically opposed supporting members 93 and 94, as best shown in Fig. 10 are secured to the underside of disk 56 by means of screws 95. Notches 96 are formed in the upper face of each of the supports 93 and 94 to receive in adjusted position the hook portions 98 of each of the weight members 97 respectively. Each of the weight members 97 is provided with a set screw 99 by which the weight members are locked in adjusted position. It is apparent that with a pair of adjusting weights, a large variety of fine adjustments are possible in order to more accurately neutralize the coriolis effect on the pendulous assembly.

Figure 1:
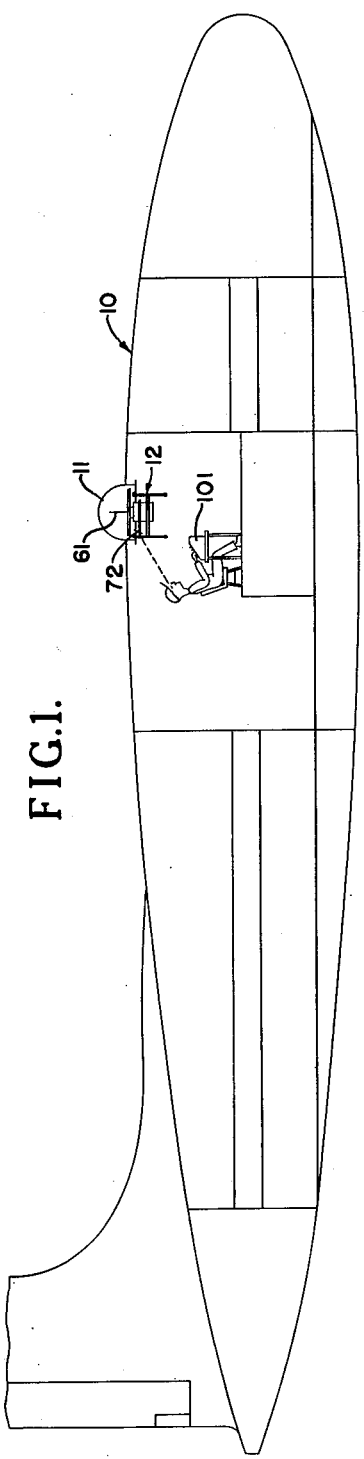
Figs. 1 and 2 are diagrammatic views of aircraft having mounted therein sun compasses according to the preferred and modified embodiments of the invention respectively.

In order to compensate for phugoid oscillations of the aircraft and assuming that each oscillation has a period of one minute and it is desired to take an average of readings over a period of two minutes or two oscillations, ten readings of the sun compass are taken, one for each twelve seconds of elapsed time, each reading being registered on an adding machine 101, Fig. 1. After the ten readings have been registered and totaled, the average reading is obtained by shifting the decimal point of the total one place to the left, thus giving a measure of relative bearing for the mid-point of the two minute interval. Although the time period of two phugoid oscillations is 120 seconds, only 108 seconds elapse between the time at which the first reading is taken and the time the last reading is taken. This is because each reading represents an approximate average of the indicated relative bearing for the six seconds prior to and six seconds following the instant reading.

Figure 4:
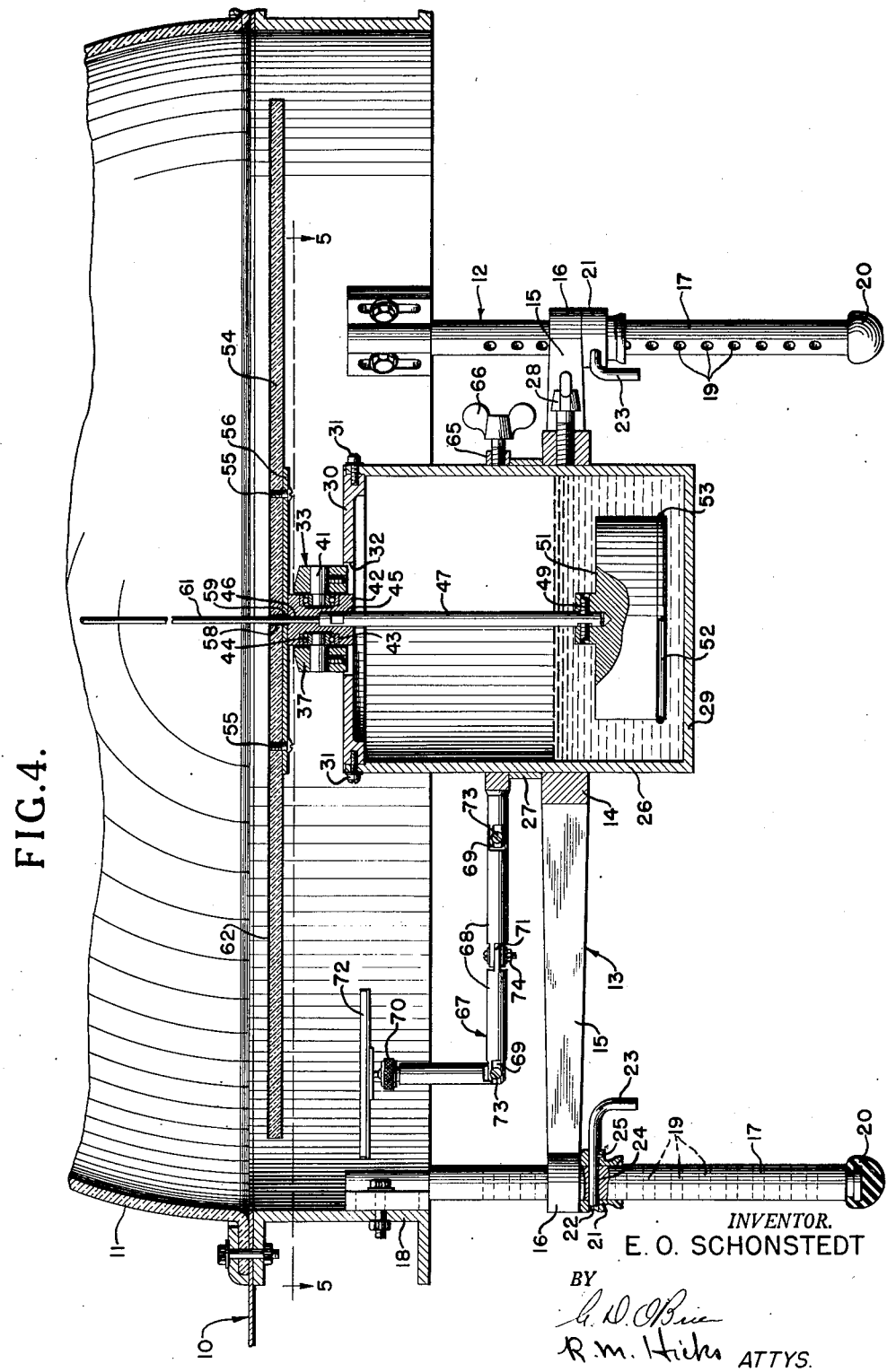
Fig. 4 is an enlarged view similar to Fig. 3 and showing the indicator mechanism in section.

As best shown in Figs. 3 and 4, these figures being views of the sun compass in the same position as in Fig. 1, the sun compass 12 is initially adjusted so that the outer gimbal axis thereof, is horizontal and at right angles to the centerline of the aircraft, the inner gimbal axis is horizontal and at right angles to the outer axis, and the rod 61 is vertical. The whole assembly in the spider is turned such that a line through 0° and 180° on scale 63 is parallel with the centerline of the aircraft, the 0° being forward and the 180° being aft.

By reason of this arrangement, the line 64 which represents the shadow of rod 61 of the sun compass, makes an angle $\theta$ with respect to the heading of the aircraft. If the heading were true north, line 64 would make an angle $\phi$ with respect to the aircraft heading, this angle being the sun's azimuth, as aforementioned. The true heading of the aircraft, therefore, is given by the angle $\epsilon$ where $$\epsilon = \phi - \theta$$

Angle $\phi$ may be determined, as aforementioned, by means of a computer such, for example, as the aforementioned azimuth computer, the sun time and latitude being known. Angle $\theta$, of course, is the relative bearing of the aircraft with respect to the sun and is obtained by averaging the readings along spaced time intervals either of the record of such readings kept by the navigator in the preferred form of the invention or of the photographic record of such readings in the alternative form thereof.

Angle $\epsilon$ may be utilized in setting up the third rectangular coordinate system as set forth in my aforementioned copending application for Method and Apparatus for Measuring the Earth's Total Magnetic Field Vector.

Obviously many modifications and variations of the present invention are possible in the light of the above teachings. It is therefore to be understood that within the scope of the appended claims the invention may be practiced otherwise than as specifically described.

The invention described herein may be manufactured and used by or for the Government of the United States of America for governmental purposes without the payment of any royalties thereon or therefor.

What is claimed as new and desired to be secured by Letters Patent of the United States is:

1. Apparatus of the character disclosed for use in an aircraft during the flight thereof comprising, a transparent astral dome mounted in the top of said aircraft, a circular frame in said aircraft and having said astral dome attached thereto, a plurality of depending supports secured to said frame, a spider slideably mounted for vertical movement on said supports, locking means for securing said spider in adjusted position on said depending supports, a sun compass having a shadow producing rod and a dial therefor, said compass being supported by said spider, said spider moving said sun compass into said astral dome when adjusted upwardly and moving said sun compass out of said dome when adjusted downwardly whereby the dial and rod may be adjusted to receive the sun's rays over a wide range of relative positions of the sun and aircraft.

2. Apparatus of the character disclosed for use in an aircraft in flight comprising, a transparent astral dome mounted in the top of said aircraft, a circular frame in said aircraft and having said astral dome attached thereto, a plurality of depending supports secured to said frame, each of said supports having a plurality of transverse bores therein, a spider having the extremities thereof slideably embracing said supports, retractible pins mounted in said extremities and adapted to extend through the bores in said supports thereby to lock said spider in selected adjusted positions, a sun compass mounted on said spider, said sun compass having a horizontal dial and a vertical rod for casting a shadow thereon, said sun compass moving in unison with said spider as said spider is moved to the selected adjusted positions whereby the sun compass receives the sun's rays over a wide range of relative positions of the sun and aircraft.

ERICK O. SCHONSTEDT.

REFERENCES CITED

The following references are of record in the file of this patent:

UNITED STATES PATENTS

| Number | Name | Date |
|---|---|---|
| 4,964 | Reeder | Feb. 9, 1847 |
| 20,506 | Oakes | June 8, 1858 |
| 499,087 | Baker | June 6, 1893 |
| 1,188,522 | Woodward | June 27, 1916 |
| 1,961,312 | Vion | June 5, 1934 |
| 2,273,876 | Lutz et al. | Feb. 24, 1942 |
| 2,456,392 | Doyle | Dec. 14, 1948 |

FOREIGN PATENTS

| Number | Country | Date |
|---|---|---|
| 2,093 | Great Britain | May 24, 1878 |
| 2,559 | Great Britain | Feb. 13, 1889 |
| 86,843 | Germany | May 16, 1948 |